United States Patent [19]
Alard et al.

[11] Patent Number: 5,187,807
[45] Date of Patent: Feb. 16, 1993

[54] BASE STATION FOR A RADIOTELEPHONE COMMUNICATION SYSTEM WITH SWITCHIG MEMBERS FOR CONNECTING LINK LINES TO TRANSMITTER MEMBERS

[75] Inventors: Michel Alard, Paris; Jean-Luc Foure, Garches, both of France

[73] Assignee: Matra Communication, Quimper, France

[21] Appl. No.: 533,600

[22] Filed: Jun. 5, 1990

[30] Foreign Application Priority Data
Jun. 12, 1989 [FR] France ............ 89 07722

[51] Int. Cl.$^5$ ............ H04B 7/14; H04B 1/02
[52] U.S. Cl. ............ 455/17; 455/19; 455/53.1; 455/73; 455/103; 375/3
[58] Field of Search ............ 455/7, 15, 19, 17, 54, 455/73, 103, 101, 53; 370/56, 80; 375/3, 4, 1; 379/58-59

[56] References Cited

U.S. PATENT DOCUMENTS

| | | | |
|---|---|---|---|
| 4,573,209 | 2/1986 | Denman et al. | 455/73 |
| 4,835,731 | 5/1989 | Nazarenko et al. | 455/14 |
| 5,048,116 | 9/1991 | Schaeffer | 455/103 |

Primary Examiner—Reinhard J. Eisenzopf
Assistant Examiner—Andrew Faile
Attorney, Agent, or Firm—Griffin, Butler, Whisenhunt & Kurtossy

[57] ABSTRACT

The relay base of the invention comprises a receive antenna connected to a receiver coupling member associated with receiver members connected to respective digital processing units. The digital processing units are connected to transmitter members via link lines each of which is associated with one of the digital processing units and all of the transmitted members via parallel connections, each transmitter member including a switching member causing one of the link lines to be put into communication with the associated transmitter member.

5 Claims, 1 Drawing Sheet

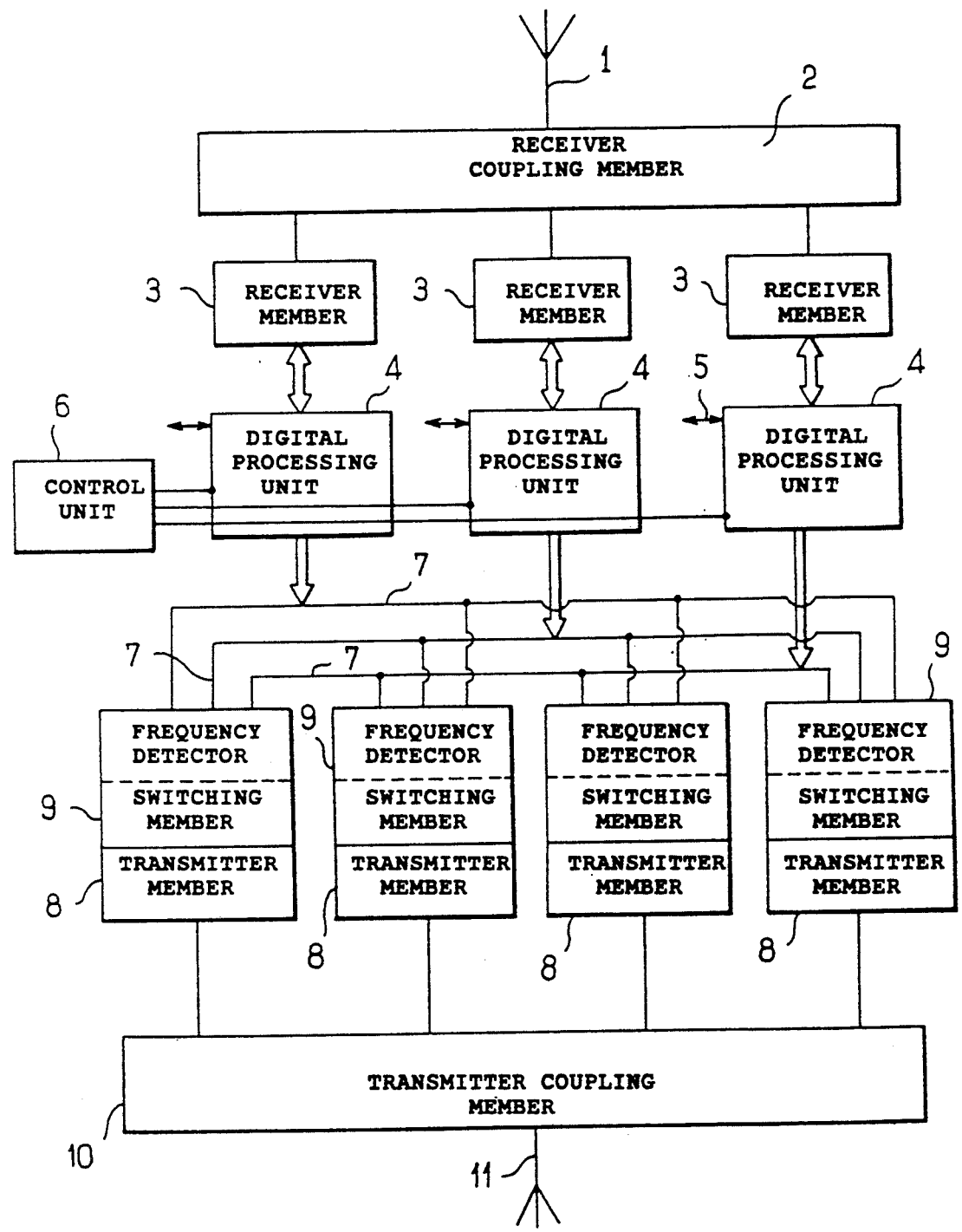

BASE STATION FOR A RADIOTELEPHONE COMMUNICATION SYSTEM WITH SWITCHIG MEMBERS FOR CONNECTING LINK LINES TO TRANSMITTER MEMBERS

The present invention relates to a relay base for a radiotelephone communication system.

BACKGROUND OF THE INVENTION

Radiotelephone communication systems are known which include a plurality of relay bases (also called base stations) installed in fixed locations, connected to a telephone network, and intended to provide radio links with a series of mobile stations moving within a territory covered by the radiotelephone communication system. In known systems, a relay base comprises at least one receive antenna for receiving radio signals; a receiver coupling member connected to the receive antenna; a series of receiver members connected to the receiver coupling member; a series of digital processing units connected to respective ones of the receiver members, to a line of a telephone network, and to a control unit; a series of transmitter members connected to the digital processing units; a transmitter coupling member connected to the transmitter members; and a transmit antenna connected to the transmitter coupling member.

In addition, in order to provide security of transmission between the base station and the mobiles, regardless of the radio obstacles that may exist between the base station and the mobiles, e.g. unfavorable configurations of terrain or various structures constituting radio screens, it is known to be desirable to transmit using frequency hopping, with each frequency being affected differently by the radio obstacles.

In order to preform frequency hopping using existing bases having the structure outlined above, it is necessary for the transmitter coupling member to be a wideband member operating in hybrid mode. Such coupling members suffer from the drawback of giving rise to power losses that are a function of the number of stages of the base, such that it is necessary to provide very large amounts of initial power at bases for relaying a large number of calls simultaneously.

In order to reduce the power required while still providing frequency hopping, proposals have been made to group together receiver members and transmitter members in common modules associated with coupling operating in a cavity mode. However, such a system requires an extremely complex switching matrix to be installed for providing the links between the transmitter/receiver modules and the digital processing units.

An object of the present invention is to provide a relay base which is relatively simple in structure and capable of operating easily in association with a transmitter coupling member of the wideband or cavity type.

SUMMARY OF THE INVENTION

In order to achieve this object, the present invention provides a relay base (or base station) for a radiotelephone communication system, the base station comprising at least one receive antenna for receiving radio signals; a receiver coupling member connected to the receive antenna; a series of receiver members connected to the receiver coupling member; a series of digital processing units connected to respective ones of the receiver members, to a line of a telephone network, and to a control unit; a series of transmitter members connected to the digital processing units; a transmitter coupling member connected to the transmitter members; and a transmit antenna connected to the transmitter coupling member; wherein the digital processing units are connected to the transmitter members via a series of link lines, each one of the link lines being connected firstly to one of the digital processing units and secondly to the transmitter members via parallel connections, and wherein each one of the transmitter members includes a switching member for connecting one of the link lines to an associated one of the transmitter members In a preferred embodiment of the invention, in which the transmitter coupling member is of the cavity type, with each one of the transmitter members being tuned at a fixed frequency, each one of the switching members includes means for detecting a frequency at which a message conveyed by the link lines is to be transmitted and for connecting a link line with a transmitter member when the detected frequency is identical to the frequency on which the transmitter is tuned.

In an advantageous embodiment of the invention, in which the transmitter coupling member is of the cavity type and in which a permanent transmission is to be provided at a beacon frequency (also called a broadcast control frequency), a transmitter member tuned to the beacon frequency transmits a data signal each time data is presented on one of the link lines for transmission at the beacon frequency, and transmits a padding signal (also called a dummy data signal) whenever no data signal is present on any one of the link lines for transmission at the beacon frequency.

In an embodiment of the invention in which the transmitted coupling member is of the hybrid type, each one of the switching members establishes a permanent connection with one of the link lines and thus controls a frequency at which an associated transmitter member is tuned.

In an advantageous version of the invention in which transmission takes place over a number of frequencies which is larger than the number of digital processing units, the transmitter coupling member is of the hybrid type, and in which a permanent transmission is to be provided at a beacon frequency (also called a broadcast control frequency), the relay base (base station) includes a beacon transmitter member in addition to the transmission members associated with the digital processing units as described above, the beacon transmitter member being associated with a switching member including means for detecting a frequency of transmission of messages from all of the digital processing units and causing a padding signal (also called a dummy signal) to be transmitted at the beacon frequency when no other one of the transmitter members is transmitting on the beacon frequency.

BRIEF DESCRIPTION OF THE DRAWING

An embodiment of the invention is described by way of example with reference to the sole FIGURE of the accompanying drawing which is a block diagram of the structure of a relay base of the invention.

DETAILED DESCRIPTION

With reference to the FIGURE, a relay base (or base station) of the invention includes a receive antenna 1 for receiving radio signals, a receiver coupling member 2 connected to the receive antenna, and a series of receiver members 3 connected to the receiver coupling member.

In the embodiment shown, the number of receiver members is limited to three, but naturally this FIGURE may be extended as a function of the number of calls to be relayed by the base.

Each of the receiver members 3 is connected to a digital processing unit 4 itself associated with a telephone network line 5 and with a common control unit 6. The receiver coupling unit 2 operates in hybrid mode and each of the receiver members stands by at any moment to receive a radio wave at a carrier frequency indicated thereto by the digital processing unit with which it is associated, and on the basis of control signals given by the control unit in which the frequency hopping rules are installed when the base is put into operation. In conventional manner the receiver members 3 are thus capable of amplifying the radio signals they receive and converting them into digital signals, while the digital processing units decode the received digital signals and relay them to the telephone network, said received digital signals themselves combining a plurality of telephone calls using conventional time division multiplexing techniques.

In addition, each of the digital processing units 4 is connected to a corresponding line in a series of link lines 7 connected in parallel for sending relay messages to transmitter members 8. Each relay message includes data to be transmitted, a mention of the frequency on which the data is to be transmitted, and, where applicable, other data such as the power at which transmission is to take place. Each of the transmitter members 8 is connected to all of the link lines via parallel connections and switching members 9 which serve to select which one of the link lines 7 is put into communication with the associated transmitter member. The transmitter members 8 are connected to a transmitter coupling member 10 which is in turn associated with a transmit antenna 11.

In the preferred embodiment of the invention, the transmitter coupling member 10 is of the cavity type, i.e. each transmitter member 8 associated with the coupling member 10 is adapted to transmit a signal at a fixed frequency. In this case, the number of transmitter members 8 is a function of the number of fixed frequencies at which it is desired to transmit. In particular, although the number of transmitter members 8 shown is limited to four in order to simplify the figure, this number could be increased or decreased as a function of the fixed frequencies on which it is desired to transmit, with the minimum number nevertheless being equal to the number of digital processing units. Further, the control unit 6 synchronizes the digital processing unit 4 so that at any instant only one of the digital processing units is sending a relay message i.e. one containing a given transmission frequency. Frequency hops are staggered over time by each of the digital processing units in accordance with pre-established rules loaded into the control unit when the installation is installed. In this embodiment, each switching member includes means for detecting relay messages i.e. one containing the transmission frequency from the digital processing units so as to determine which of the digital processing units should be connected to the transmitter 8 with which the switching member is associated. Each time a switching member 9 detects that data is to be transmitted at the frequency of the transmitter member with which it is associated, the switching member connects it to the corresponding link line.

The transmitter member thus put into communication processes the data in conventional manner and transmits the corresponding modulated signal to the transmit antenna 11 which then radiates the useful modulated signal.

When it is desired to establish permanent transmission at a beacon frequency (also called a broadcast control frequency), with the beacon frequency being used as a reference by the mobiles even when no data is being transmitted, one of the transmitter members 8 is naturally tuned to the beacon frequency, and this transmitter causes a data signal to be transmitted each time a relay message containing data to be transmitted at the beacon frequency is present on a link line, and a padding signal (also called a dummy signal) to be transmitted when there is no modulated signal to be transmitted at the beacon frequency on any of the link lines. Depending on decisions made during the design of each system, the padding signal may be non-modulated transmission at the beacon frequency or it may be a transmission which is modulated as a function of rules specific to the system.

Although the preferred embodiment of the relay base of the invention is used with a coupling member of the cavity type so as to reduce the power required in operation, the base of the invention is easily adapted to operation with a hybrid type of transmitter coupling member 10. In this case, each switching member 9 is controlled to ensure that a permanent connection is established with one of the link lines 7, and the base then operates in the same manner as a traditional base having the structure outlined at the beginning of the present description. In this case, the number of transmitter members 8 may be limited to the number of digital processing units 4. However, when the number of frequencies at which transmission takes place is greater than the number of digital processing units, and when it is also desired to ensure permanent transmission on a beacon frequency, it is advantageous to provide a padding transmitter member 8 (also called a dummy signal transmitting member) in addition to the transmitter members associated with the digital processing units. The switching member 9 associated with the padding transmitter member then includes means for detecting relay messages from all of the digital processing units in order to ensure that padding is transmitted at the beacon frequency whenever none of the transmitter units is transmitting a signal at the beacon frequency. It will be observed that in this case, a base of the invention has a further advantage over conventional bases in which the beacon frequency needs to be associated with a complete line comprising a receiver member, a digital processing unit, and a transmitter member.

Naturally the invention is not limited to the embodiment described, and variants may be applied thereto without going beyond the scope of the invention.

In particular, although the embodiment described has one telephone line 5 associated with each digital processing unit 4, a single telephone line may be associated with several processing units depending on the respective capacities of the telephone line and of the digital processing units.

We claim:

1. A base station for a radiotelephone communication system, the base station comprising at least one receive antenna for receiving radio signals; a receiver coupling member connected to the receive antenna; receiver members connected to the receiver coupling member; digital processing units connected to respective ones of the receiver members, to a line of a telephone network, and to a common control unit; transmitter members connected to the digital processing units; a transmitter coupling member connected to the transmitter members; and a transmit antenna connected to the transmitter coupling member, wherein the digital processing units are connected to the transmitter members via a plurality of link lines, the link lines performing parallel connections between the digital processing units and the transmitter members, wherein any one of the digital processing units can be connected to any one of the transmitter members via a selected link line, and wherein each one of the transmitter members includes a switching member for connecting said selected link line to an associated one of the transmitter members.

2. A base station according to claim 1, in which the transmitter coupling member is of the cavity type, with the transmitter members being each tuned at a different fixed frequency, wherein the switching members each includes means for detecting a signal at the fixed frequency on which the corresponding transmitter member is tuned, and wherein the selected link line is the link line conveying a message at the fixed frequency on which the corresponding transmitter member is tuned.

3. A base station according to claim 2, in which a permanent transmission is to be provided at a broadcast control frequency wherein a transmitter member tuned on the broadcast control frequency transmits a data signal each time data is presented on one of the link lines for transmission at the broadcast control frequency, and transmits a dummy data signal whenever no data signal is present on any one of the link lines for transmission at the broadcast control frequency.

4. A base station according to claim 1, in which the transmitter coupling member is of the hybrid type, wherein each one of the switching members establishes a permanent connection with one of the link lines and controls a frequency at which an associated transmitter member is tuned.

5. A base station according to claim 4, in which transmission is performed on a number of frequencies larger than the number of digital processing units, and in which a permanent transmission is to be provided at a broadcast control frequency, wherein the base station includes a dummy data transmitter member in addition to the transmitter members associated with the digital processing units, the dummy data transmitter member being associated with a switching member including means for detecting a frequency of transmission of messages from all of the digital processing units and for causing a dummy data signal to be transmitted at the broadcast control frequency when no other one of the transmitter members is transmitting on the dummy data frequency.

* * * * *